(12) United States Patent
Tabanoglu et al.

(10) Patent No.: US 10,023,176 B2
(45) Date of Patent: Jul. 17, 2018

(54) METHOD AND DEVICE FOR FORECASTING THE RANGE OF A VEHICLE WITH AN AT LEAST PARTIALLY ELECTRIC DRIVE

(71) Applicant: VOLKSWAGEN AG, Wolfsburg (DE)

(72) Inventors: Gökhan Tabanoglu, Berlin (DE); Mirko Vujasinovic, Wolfsburg (DE)

(73) Assignee: Volkswagen AG (DE)

( * ) Notice: Subject to any disclaimer, the term of this patent is extended or adjusted under 35 U.S.C. 154(b) by 120 days.

(21) Appl. No.: 14/964,767

(22) Filed: Dec. 10, 2015

(65) Prior Publication Data

US 2016/0167643 A1 Jun. 16, 2016

(30) Foreign Application Priority Data

Dec. 16, 2014 (DE) .......................... 10 2014 226 031

(51) Int. Cl.
| | |
|---|---|
| *B60W 20/15* | (2016.01) |
| *B60L 11/18* | (2006.01) |
| *B60L 3/12* | (2006.01) |
| *B60W 20/00* | (2016.01) |
| *B60W 40/00* | (2006.01) |

(Continued)

(52) U.S. Cl.
CPC ............... *B60W 20/15* (2016.01); *B60L 1/00* (2013.01); *B60L 3/12* (2013.01); *B60L 11/1861* (2013.01); *B60W 20/00* (2013.01); *B60W 40/00* (2013.01); *B60W 50/14* (2013.01); *B60L 2260/52* (2013.01); *B60L 2260/54* (2013.01);

(Continued)

(58) Field of Classification Search
None
See application file for complete search history.

(56) References Cited

U.S. PATENT DOCUMENTS

| 5,686,895 A * | 11/1997 | Nakai ................. B60L 11/1861 340/439 |
|---|---|---|
| 2003/0150655 A1 * | 8/2003 | Itou ..................... B60L 11/1881 429/515 |

(Continued)

FOREIGN PATENT DOCUMENTS

| DE | 10302504 A1 * | 9/2004 | .......... B60L 11/1851 |
|---|---|---|---|
| DE | 102010001011 A1 | 7/2011 | |

(Continued)

OTHER PUBLICATIONS

Fakler; Machine translation of DE 10302504 A1; Sep. 2004; espacenet.com.*

*Primary Examiner* — John Olszewski
*Assistant Examiner* — David P. Merlino
(74) *Attorney, Agent, or Firm* — Barnes & Thornburg LLP

(57) ABSTRACT

A method for predicting a range of a vehicle having an at least partially electric drive. When a first operating mode of the vehicle is ended at a time, the vehicle switches into a second operating mode when the first operating mode ends. The range of the vehicle is determined when the first operating mode ends. Starting at the time at which the first operating mode ends, the temporal development of a parameter from the surroundings of the vehicle is determined for a certain duration, wherein the vehicle is in the second operating mode for at least a portion of the certain duration. Also disclosed is a device for predicting a range of a vehicle having an at least partially electric drive.

14 Claims, 8 Drawing Sheets

(51) Int. Cl.
*B60W 50/14* (2012.01)
*B60L 1/00* (2006.01)
(52) U.S. Cl.
CPC ... *B60W 2510/244* (2013.01); *B60W 2550/12* (2013.01); *Y02T 10/84* (2013.01); *Y10S 903/903* (2013.01)

(56) References Cited

U.S. PATENT DOCUMENTS

| | | | | |
|---|---|---|---|---|
| 2010/0138142 A1* | 6/2010 | Pease | B60W 20/15 | 701/123 |
| 2011/0313610 A1* | 12/2011 | Riegelman | B60W 20/12 | 701/34.4 |
| 2012/0262104 A1* | 10/2012 | Kirsch | B60L 11/1861 | 320/101 |
| 2013/0204456 A1* | 8/2013 | Tippelhofer | B60L 11/1809 | 701/1 |
| 2013/0218447 A1* | 8/2013 | Mayinger | G01C 21/3469 | 701/123 |
| 2014/0172282 A1* | 6/2014 | Feng | B60L 11/1838 | 701/117 |
| 2014/0214267 A1* | 7/2014 | Sellschopp | B60W 20/11 | 701/34.2 |
| 2016/0023562 A1* | 1/2016 | Parra Ortiz | B60L 11/1838 | 320/109 |

FOREIGN PATENT DOCUMENTS

| | | |
|---|---|---|
| DE | 102010038539 A1 | 2/2012 |
| DE | 102011113714 A1 | 3/2013 |
| EP | 2385349 A1 | 11/2011 |
| WO | 2012048766 A1 | 4/2012 |

\* cited by examiner

| Location of the vehicle: | | current position | | Set |
|---|---|---|---|---|
| End of journey: | | 13:00 | 05.05.2014 | Set |
| SoC at end of journey: | Set | 75% | | Set |
| Commencement of journey: | | 12:00 | 06.05.2014 | Set |
| SoC at commencement of journey: | Set | 96% | | Set |
| Next commencement of charging: | Set | 4:00 | 06.05.2014 | Set |
| Charging type / max. current: | | Outlet | 16 A | Set |
| Pre-air conditioning: | | activated | | Set |
| Max duration of the pre-air conditioning: | | 15 min. | | Set |

METHOD AND DEVICE FOR FORECASTING THE RANGE OF A VEHICLE WITH AN AT LEAST PARTIALLY ELECTRIC DRIVE

PRIORITY CLAIM

This patent application claims priority to German Patent Application No. 10 2014 226 031.0, filed 16 Dec. 2014, the disclosure of which is incorporated herein by reference in its entirety.

SUMMARY

Illustrative embodiments relate to a method and a device for predicting a range of a vehicle having an at least partially electric drive.

BACKGROUND

Electrically driven vehicles, for example, passenger cars or trucks, usually comprise a storage element for storing electric energy, such as, for example, a rechargeable accumulator. Since the excess kinetic energy of the vehicle can be partially recovered as electric energy during braking, depending on the situation, which electric energy is then immediately available again for a subsequent acceleration process, the energy consumption and the range can be influenced by means of the driving manner and the type of energy recovery.

It is generally desirable, upon commencement of driving and during driving, to provide the driver with information regarding the operating resource reserves of the vehicle and to display this information in such a way that the driver can intuitively understand it. In particular, it is desirable in the early phase of electromobility to provide the driver with highly precise information regarding the expected range of his vehicle. On the one hand, the ranges of such vehicles are still substantially less than the ranges of vehicles having an internal combustion engine. On the other hand, consideration must be given for the still relatively sparse availability of suitable charging stations for the vehicle battery upon commencement of driving, and therefore the range of an electric vehicle and parameters which influence the range are important information for the driver, which should be displayed in the vehicle.

Disclosed embodiments provide a method and a device, by means of which a reliable range determination of a vehicle can be provided at any time.

BRIEF DESCRIPTION OF THE DRAWINGS

Disclosed embodiments will now be explained with reference to the attached drawings.

DETAILED DESCRIPTION OF THE DISCLOSED EMBODIMENTS

Figure 1:
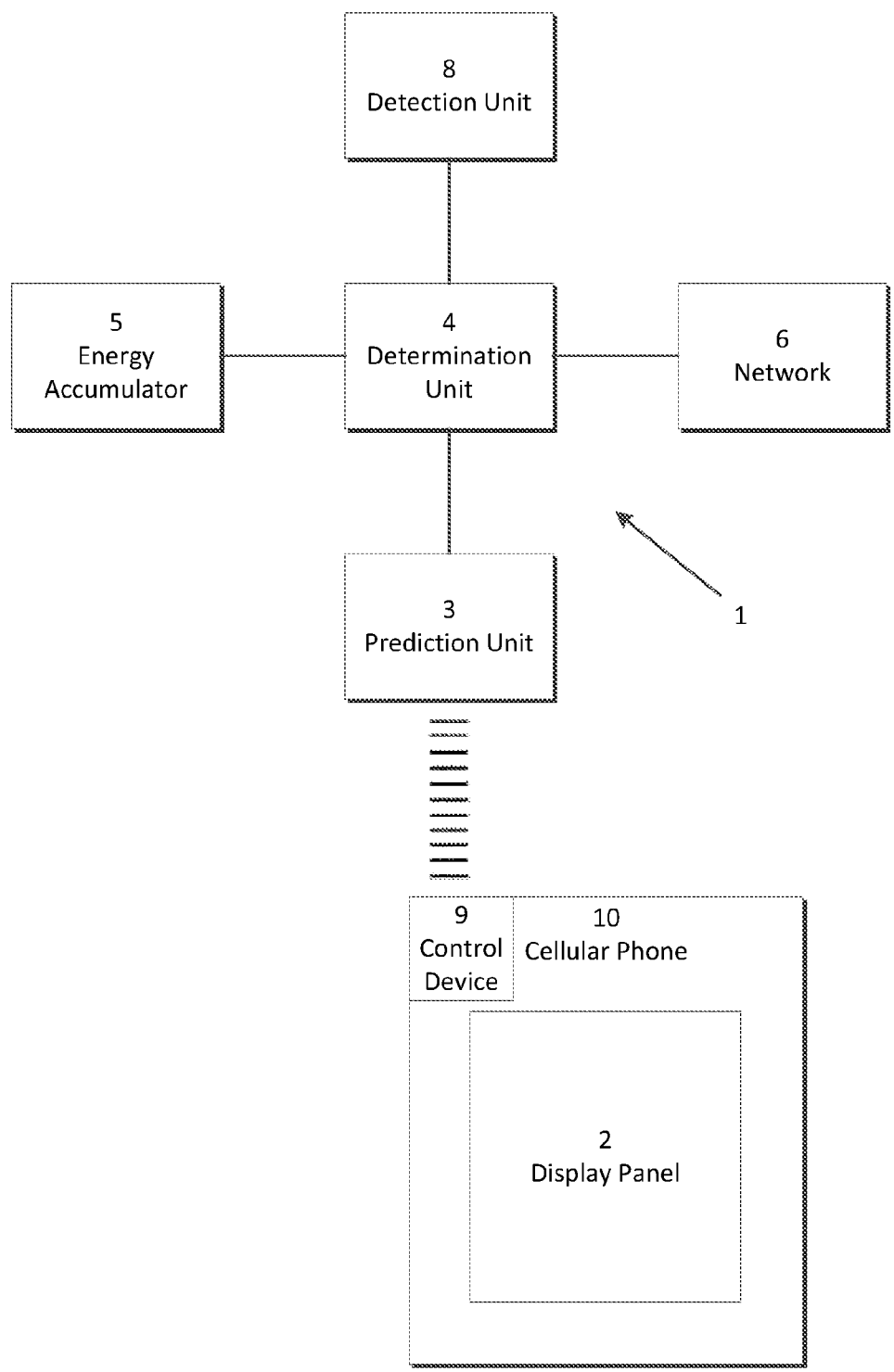
FIG. 1 shows a first exemplary embodiment of the disclosed device.

In the disclosed method, it is detected when a first operating mode of the vehicle is ended at a time, wherein the vehicle switches into a second operating mode when the first operating mode ends. The range of the vehicle is determined when the first operating mode ends. Starting at the time at which the first operating mode ends, the temporal development of a parameter from the surroundings of the vehicle is determined for a certain duration, wherein the vehicle is in the second operating mode for at least a portion of the certain duration. The temporal development of the range is predicted for the certain duration as a function of the range when the first operating mode ends and as a function of the temporal development of the parameter. The temporal development of the range is output. In particular, the vehicle is in a driving mode when in the first operating mode and is in a resting mode when in the second operating mode. In particular, the first operating mode is understood to be a mode in which the engine of the vehicle is switched on. The second operating mode is a mode in which the engine of the vehicle is switched off.

By means of the disclosed method, a range prediction is output to the user also during a resting phase of the vehicle, in particular a stationary phase. As a rule, the range of a vehicle is predicted only for the duration of the journey. At the end of the journey, a remaining range of the vehicle which can be achieved under the conditions present at the time of the end of the journey is output. The range of a vehicle is dependent upon different parameters. If these change during the stationary phase of the vehicle, the range of the vehicle also changes. If the user returns to the vehicle after a certain amount of time, he finds a different range than what was predicted at the previous end of the journey. It is therefore not possible to reliably plan for future journeys. Due to the prediction of the temporal development of the range as a function of a parameter from the surroundings of the vehicle, the user can better estimate the range he has available to him when he commences another journey and can therefore better plan his future journeys.

In at least one disclosed embodiment of the method, a further time is determined, at which the switch from the second operating mode to the first operating mode is likely to take place, and the further time is output. In this case, the further time is the time when a new journey will commence. As a result, when the temporal development of the range over a relatively long period of time is output, the user can more accurately estimate the predicted range when a new journey is commenced. The user can, in particular, set the further time himself. As an alternative, the further time can be determined from a driving history of the vehicle. In this case, it is detected, for example, over a relatively long time period, at which times of day the user uses the vehicle and the further time is estimated on the basis thereof.

In particular, the parameter comprises weather conditions in the surroundings of the vehicle. As a temporal development, a weather forecast for the certain duration is determined. In this case, the weather forecast can be automatically obtained via a network and can be used for the forecast. Weather conditions are of particular interest in this case, because, in stationary phases, in particular, in which the vehicle is usually not switched on, weather conditions exert the greatest influence on the range prediction during the stationary phase. The external temperature, in particular, has a great influence on the temporal development of the range. The energy, which must be expended for the air conditioning of the vehicle, is dependent on the external temperature in particular. The energy quantity required to bring the internal temperature to a desired value is that much greater, the more the external temperature and the desired internal temperature deviate from one another.

In particular, the position of the vehicle is determined and the weather forecast for the position of the vehicle is determined. As a result, the prediction of the range can be improved. The probability that weather fluctuations, which can also occur within a few kilometers, influence the prediction can therefore be reduced. The position of the vehicle can be determined in this case, in particular, via satellite navigation, such as, for example, GPS.

In a further disclosed embodiment, it is determined whether an energy accumulator of the vehicle is charged during the second operating mode. If the energy accumulator is charged, the temporal development of the state of charge of the energy accumulator is predicted and is taken into account in the prediction of the temporal development of the range. If the vehicle is charged during the second operating mode, for example, this has a great influence on the range of the vehicle when a new journey is commenced. This must therefore be taken into account in the prediction of the temporal development.

In another disclosed embodiment, a target energy quantity which the energy accumulator of the vehicle should have at the further time is determined. A target time is determined, at which a state of charge for charging the energy accumulator must be started to provide the target energy quantity at the further time. The target time is output. As a result, the user can determine himself which state of charge the energy accumulator should have when a new journey is commenced. In particular, a complete charging of a vehicle battery can be undesired, for reasons of cost. To enable the desired state of charge of the battery to be displayed at the time when a new journey is started, a target time is calculated, at which the state of charge must be started to permit the desired target energy quantity to be provided when a new journey is commenced.

In a further disclosed embodiment, the temporal resolution of the certain duration is dependent upon the temporal resolution of the parameter. The temporal resolution of a weather forecast is usually limited and lasts for one to multiple hours or days. This means that each time within the temporal development of the parameter likewise has a certain duration.

In addition, a graphic depiction can be generated on a display panel, by means of which the temporal development of the range is output. In particular, the graphic depiction comprises a diagram, optionally a bar graph, wherein the certain duration is plotted on a first axis and the predicted range is plotted on a second axis. In this case, the predicted range is output by means of a diagram, in particular by means of a length of the bars of the bar graph. This is a particularly intuitive and simple way to depict the range. In particular, the bar depiction results in an easily understood way to depict the range, in which the length of the bars is an easily understood display of the predicted range at any time during the predicted temporal development.

For example, the temporal resolution of the parameter has the unit "hours". The certain duration comprises, for example, 24 hours and times of day having intervals of one hour between each of two consecutive times of day are plotted on the first axis. An hourly resolution is sufficient to enable a satisfactory resolution of the temporal development of the range to be provided. In addition, as a rule, there is no better time resolution for a weather forecast.

In addition, the graphic diagram can have a graphic element for each time which is output. In this case, the times which are output are, in particular, the further time and the target time. The first time is indirectly output via the first time of day on the first axis of the diagram. The user is, therefore, clearly shown, in the graphic representation, when a charging process starts and when a next commencement of driving is planned.

In addition, a time at which a pre-air conditioning should be started can be determined. Pre-air conditioning is usually set for approximately 15 minutes before the commencement of driving. After 15 minutes of pre-air conditioning, the user usually finds himself in his desired climatic conditions in the vehicle. The pre-air conditioning can always be activated, for example, 15 minutes before the planned commencement of driving. As an alternative, the user can enter the time at which a pre-air conditioning should be started. A graphic element for the time of the pre-air conditioning can likewise be displayed on the display panel for this purpose.

In a further disclosed embodiment, at least one of the graphic elements in the diagram can be moved along the first axis, so that the time can be set by moving the graphic element. As a result, the user can manually set the desired time in a simple and intuitive manner.

In particular, the display panel on which the temporal development of the range is output is not disposed in the vehicle itself. For example, the temporal development is output via a display panel of a cellular phone, tablet computers, PCs, or any other devices having display panels. As a result, the user does not need to return to the vehicle to change settings or to look at the temporal development of the range to set the times or output the temporal development of the range.

Disclosed embodiments also relate to a device for predicting a range of a vehicle having an at least partially electric drive. The device comprises a detection unit, by means of which it is detected when a first operating mode of the vehicle is ended at a time, wherein the vehicle switches into a second operating mode when the first operating mode ends. In addition, the device comprises a determination unit, by means of which the range of the vehicle can be determined when the first operating mode ends and, starting at the time when the first operating mode ends, the temporal development of a parameter from the surroundings of the vehicle can be determined for a certain duration. In addition, the device comprises a prediction unit, by means of which the temporal development of the range for the certain duration can be predicted as a function of the range when the first operating mode ends and as a function of the temporal development of the parameter. The predicted temporal development of the range can be output by means of an output unit. The disclosed device is suited, in particular, for carrying out the disclosed method.

Disclosed embodiments also relate to a vehicle comprising such a device. The vehicle is, in particular, a vehicle comprising a fully electric drive, for example, an electric vehicle, or a vehicle having a partially electric drive, i.e., for example, a hybrid vehicle. In the case of a hybrid vehicle, the total range of the vehicle is composed of the electric range, i.e., the range which can be achieved with the energy quantity available in the traction battery of the vehicle, and the conventional range, i.e., the range which can be achieved by means of the fuel quantity available in a conventional tank and which is available to an internal combustion engine. When a hybrid vehicle is operated, the vehicle is initially driven with electric energy from the traction battery. An internal combustion engine is not used until the energy from the traction battery is no longer sufficient for driving the vehicle. In the case of a hybrid vehicle, the electric range, in particular, is of interest to the user. By means of the disclosed method, the electric range is therefore predicted and output to the user in the case of a hybrid vehicle, in particular.

Figure 2:
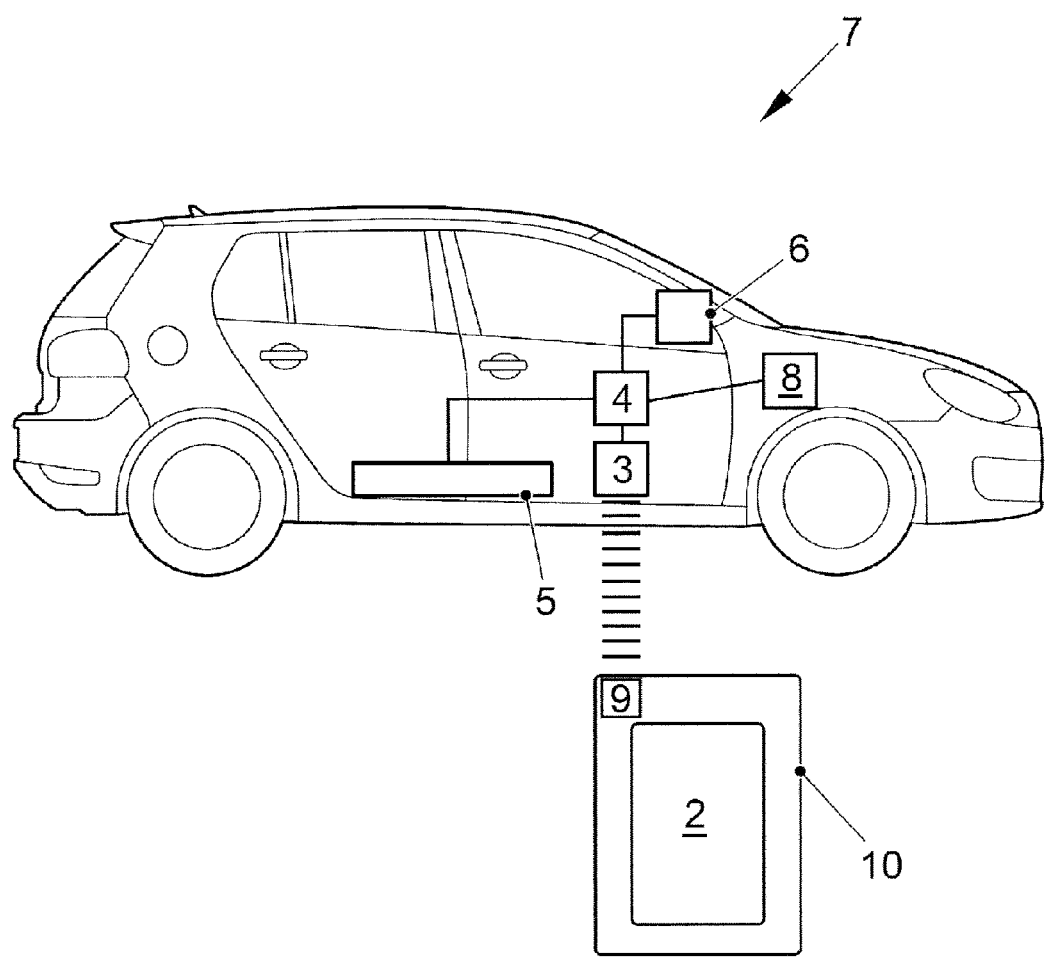
FIG. 2 shows an exemplary arrangement of the first exemplary embodiment of the disclosed device in a vehicle.

A first exemplary embodiment of the device 1 and an arrangement of the device 1 in a vehicle 7 are explained with reference to FIGS. 1 and 2.

The device 1 initially comprises a detection unit 8, by means of which it is possible to detect when the vehicle 7 switches from a first operating mode into a second operating mode.

The first operating mode in this case is a driving mode, in particular. In particular, the first operating mode is understood to be a mode in which the engine of the vehicle 7 is switched on. The second operating mode is, in particular, a resting mode of the vehicle 7. In particular, the second operating mode is a mode in which the engine of the vehicle 7 is switched off. The detection unit 8 therefore detects when the engine of the vehicle 7 is switched off.

In addition, the device 1 comprises a determination unit 4. The determination unit 4 is configured, in this case, for determining different parameters. First, the determination unit 4 determines what the range of the vehicle 7 is when the driving mode ends. For this purpose, the determination unit 4 determines, in particular, the state of charge of an energy accumulator 5, for example, a traction battery, at the time when the driving mode ends and calculates the range on the basis thereof.

In addition, the determination unit 4 determines, for example, via a network 6, the temporal development of the weather in the surroundings of the vehicle 7. In this case, the weather is a parameter which influences the range prediction during a resting phase of the vehicle 7.

The parameters determined by the determination unit 4 are transmitted to a prediction unit 3. In the prediction unit 3, the temporal development of the range is then predicted on the basis of the corresponding parameters.

The predicted temporal development of the range is transmitted to a control device 9, which is disposed in a cellular phone 10 of the user. The control device 9 then generates, on the display panel 2 of the cellular phone 10 of the user, a graphic depiction for visualizing the temporal development of the range.

In a first exemplary embodiment of the device 1, the plurality of device components is disposed in the vehicle 7 itself.

Figure 3:
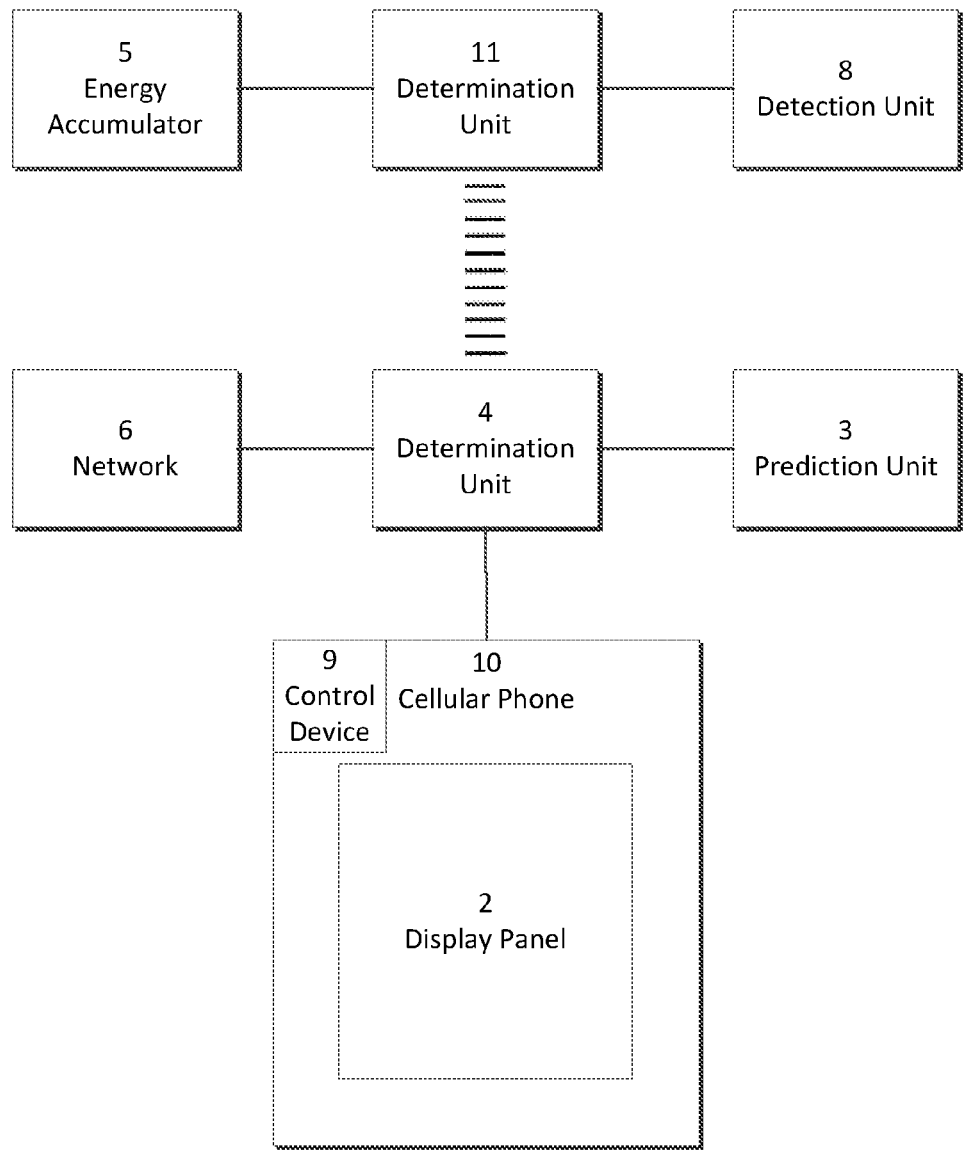
FIG. 3 shows a second exemplary embodiment of the disclosed device.

In the second exemplary embodiment shown in FIG. 3, the determination unit 4 and the prediction unit 3 are disposed directly in or on the cellular phone 10 of the user. The cellular phone 10 is coupled to the network 6 from which the determination unit 4 obtains the weather forecast.

In particular, the cellular phone 10 of the user has an application which has been developed especially for the range prediction. The traction battery 5 and the detection unit 8 are furthermore disposed in the vehicle 7. In addition, the device 1 of the second exemplary embodiment comprises a further determination unit 11 which is coupled to the determination unit 4, so that the determination unit 4 receives information, by means of the determination unit 11, regarding the range and the state of charge of the traction battery 5.

A touch-sensitive surface, in particular, can be disposed on the display panel 2 of the cellular phone 10, by means of which the user can enter settings for the prediction of the temporal development of the range.

The vehicle 7 can be either an electric vehicle or a hybrid vehicle. Both vehicle types comprise a traction battery 5 from which the energy for driving the vehicle 7 is supplied. In an electric vehicle, the drive energy is supplied only by the traction battery 5. When the energy quantity in the traction battery 5 approaches the end, the traction battery 5 must be recharged. Continued operation of the vehicle 7 is not possible otherwise.

In the case of a hybrid vehicle, however, when the traction battery 5 is sufficiently charged, the energy is supplied by the traction battery 5. If the traction battery 5 is no longer sufficiently charged, the drive energy is obtained from a conventional fuel, for example, gasoline or diesel. Therefore, the total range of a hybrid vehicle is composed of the electric range and a conventional range which can be achieved by the drive by means of a conventional fuel. In the case of a hybrid vehicle, the disclosed method is designed, in particular, for the electric range which can be achieved with the energy quantity available in the traction battery 5. As a result, the user of a hybrid vehicle can better estimate how much further he can drive using a purely electric drive. In the following, the term "range" is intended to mean the electric range in particular.

Figure 4:
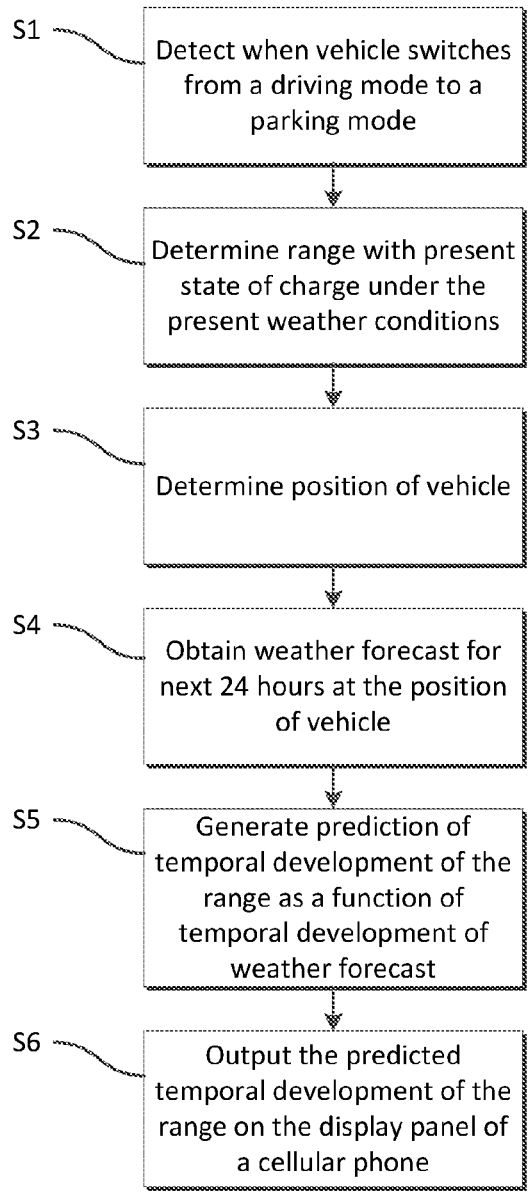
FIG. 4 shows a flow chart of an exemplary embodiment of the disclosed method.

An exemplary embodiment of the disclosed method is explained with reference to FIG. 4.

The starting point is that the driver switches off his vehicle 7 for parking, for example, overnight.

In this case, the driver first switches off the engine of the vehicle 7. In step S1 of the method it is initially detected that the vehicle 7 switches from a driving mode into a parking mode.

In step S2, the range which can be achieved with the present state of charge under the present weather conditions is determined.

In step S3, the determination unit 4 determines the position of the vehicle 7. This is carried out, for example, via a navigation system having an integrated GPS receiver.

In step S4, the determination unit 4 connects to the network 6 and obtains, via the network, a weather forecast for the next 24 hours at the position of the vehicle 7. In this case, the weather forecast has a temporal resolution having the unit "hours". This means that a separate weather forecast is provided for each of the 24 hours. In this case, the weather forecast for the 24 hours corresponds to a temporal development of the weather within the next 24 hours.

In step S5, a prediction of the temporal development of the range within the next 24 hours is generated as a function of the temporal development of the weather forecast.

In step S6, the predicted temporal development of the range is output on the display panel 2 of the cellular phone 10 of the user.

The display which is displayed to the user on the display panel 2 of his cellular phone 10 is explained with reference to FIGS. 5 and 6*a* to 6*c*.

First, a bar graph 12 having an x-axis and a y-axis is generated. The range R in kilometers is plotted on the y-axis and the determined duration t in hours is plotted on the x-axis. The x-axis is subdivided into times of day, in particular. In this case, there is a time span of one hour between two successively plotted times of day. The temporal resolution of the x-axis is therefore one hour. One bar 12.1 is plotted in the bar graph 12 for each x-axis point, i.e., for each time of day. Each bar 12.1 has a certain length L. The length L of each bar 12.1 corresponds to the range R predicted for the corresponding hour.

An icon 14 for the weather forecast is also displayed above the bar graph 12 for each hour. In addition, the expected external temperature is displayed above the icons 14. A value for the state of charge 16 is output between the bar graph 12 and the icons 14. As the external temperature decreases, the energy which must be expended for the air conditioning of the vehicle 7 for a new journey must be increased. This energy is then unavailable for conversion into the range R. As the external temperature decreases, the predicted value for the range R therefore also decreases.

In addition, a table view 13 is displayed on the display panel 2. Relevant parameters for the range prediction are displayed in the table view 13. Information regarding the most recently completed journey is displayed in the top three columns 13.1. In particular, the location of the vehicle 7, a time t1 of the end of the journey, and the state of charge at the end of the journey are displayed. In this case, the time t1 is composed, in particular, of the time of day and the date.

Information regarding the next commencement of a journey is indicated in columns 13.2. For example, the user can set a time t2 at which he is likely going to use the vehicle 7 again. As an alternative, a next commencement of a journey can be determined via a history of the vehicle use. In addition, a state of charge which the traction battery 5 should have at the commencement of the next journey can be indicated.

Information regarding the state of charge is indicated in columns 13.3. At the end of the journey, the user can either charge the vehicle 7 or not. If the user connects the vehicle 7 to a charging station, for example, a socket, he is shown, via the display, a target time t3, which represents the commencement of the actual charging process, and a target state of charge, which the traction battery 5 should have at the commencement of the next journey. If the user does not enter a target time t3 at which the charging process is intended to commence, this is determined in such a way that the value set for the target state of charge is achieved at the next commencement of a journey. The user can also set the target state of charge himself. In addition, the user is automatically displayed the type of charging used to charge the vehicle 7, i.e., for example, via a common household socket or via a charging station. The maximum charging current is also determined and output. If the vehicle 7 is not charged during the idle mode, the user is not displayed a time of day or a date for the next commencement of charging. In this case, the information regarding the type of charging and the maximum current are likewise not displayed.

Information regarding pre-air conditioning is provided in the last two columns. Provided certain conditions are met, the user can set, in principle, whether the pre-air conditioning should be activated during the resting phase of the vehicle 7 or not. If the pre-air conditioning is activated and, simultaneously, the vehicle 7 is charged, the energy required for the pre-air conditioning is drawn from the charging device. The energy required for this is therefore not subtracted from the energy quantity in the traction battery 5. In addition, the user can set the length of time for pre-air conditioning to be carried out. A duration of 15 minutes is usually sufficient for heating or cooling a vehicle 7 to the internal temperature desired at the commencement of driving.

Graphic elements 15.1 to 15.3 are displayed at certain times t2 to t4 in the bar graph 12. The position of the graphic elements 15.1 to 15.3 in the bar graph 12 is dependent upon the times t2 to t4. The graphic elements 15.1 to 15.3 have the shape of a rod having a knob on the end. Every graphic element 15.1 to 15.3 can have a different color. Simultaneously, the columns in the table view 13, which relate to a particular graphic element 15.1 to 15.3, can be depicted in the same color. As a result, the assignment of the graphic elements 15.1 to 15.3 to a time is made easier for the user. If the graphic element 15.1 is depicted in green, for example, the columns 13.3 of the table view 13 are displayed with a green background. If the graphic element 15.2 is depicted in blue, the associated columns 13.4 are likewise displayed with a blue background. If the graphic element 15.3 is depicted in yellow, the columns 13.2 are displayed with a yellow background. By means of this color pattern, the user is easily shown which graphic element 15.1 to 15.3 belongs to which time t2 to t4.

Figure 5:
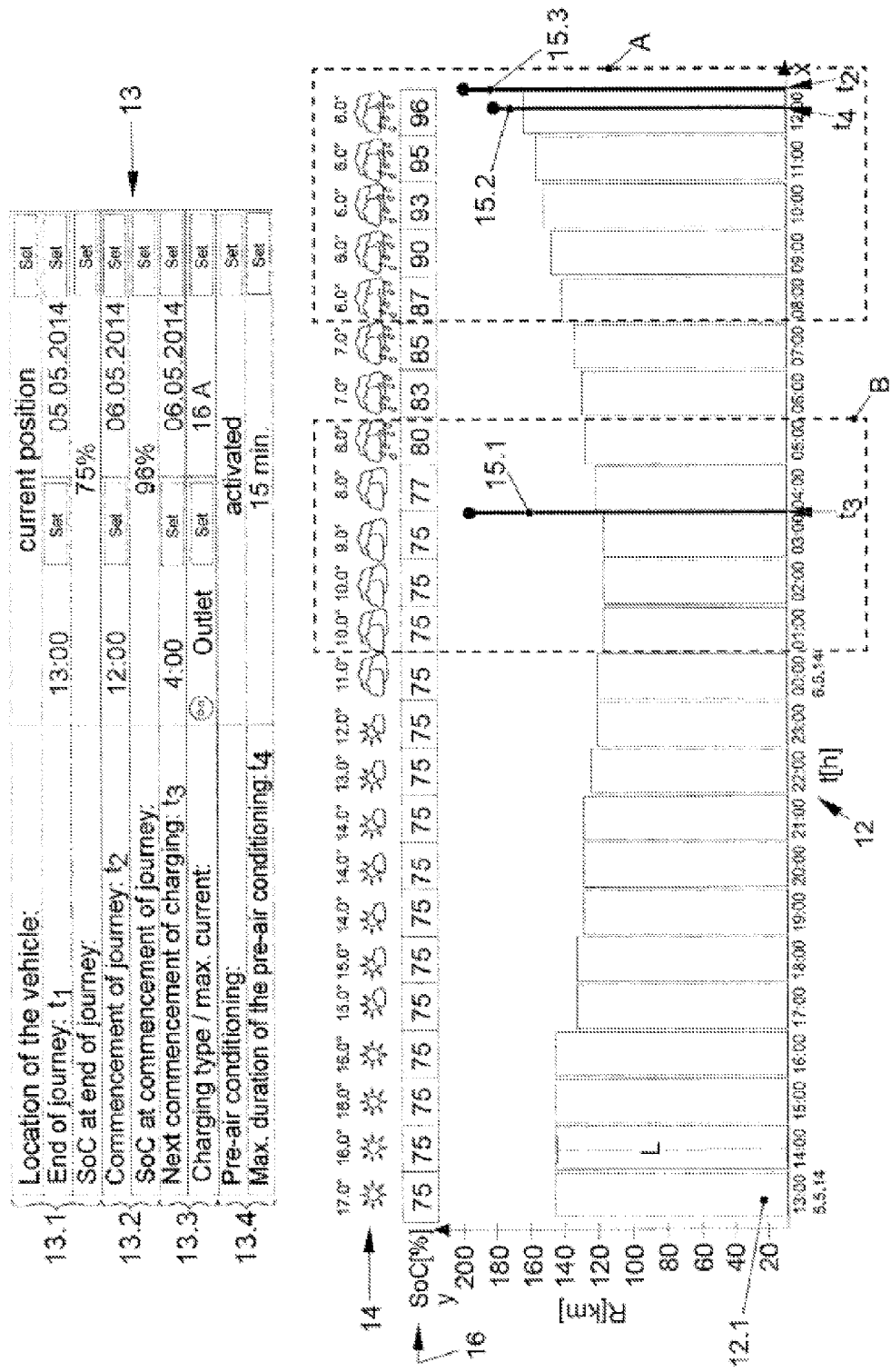
FIG. 5 shows a display of the type which can be generated on a display panel by the disclosed method.
Figure 6A:
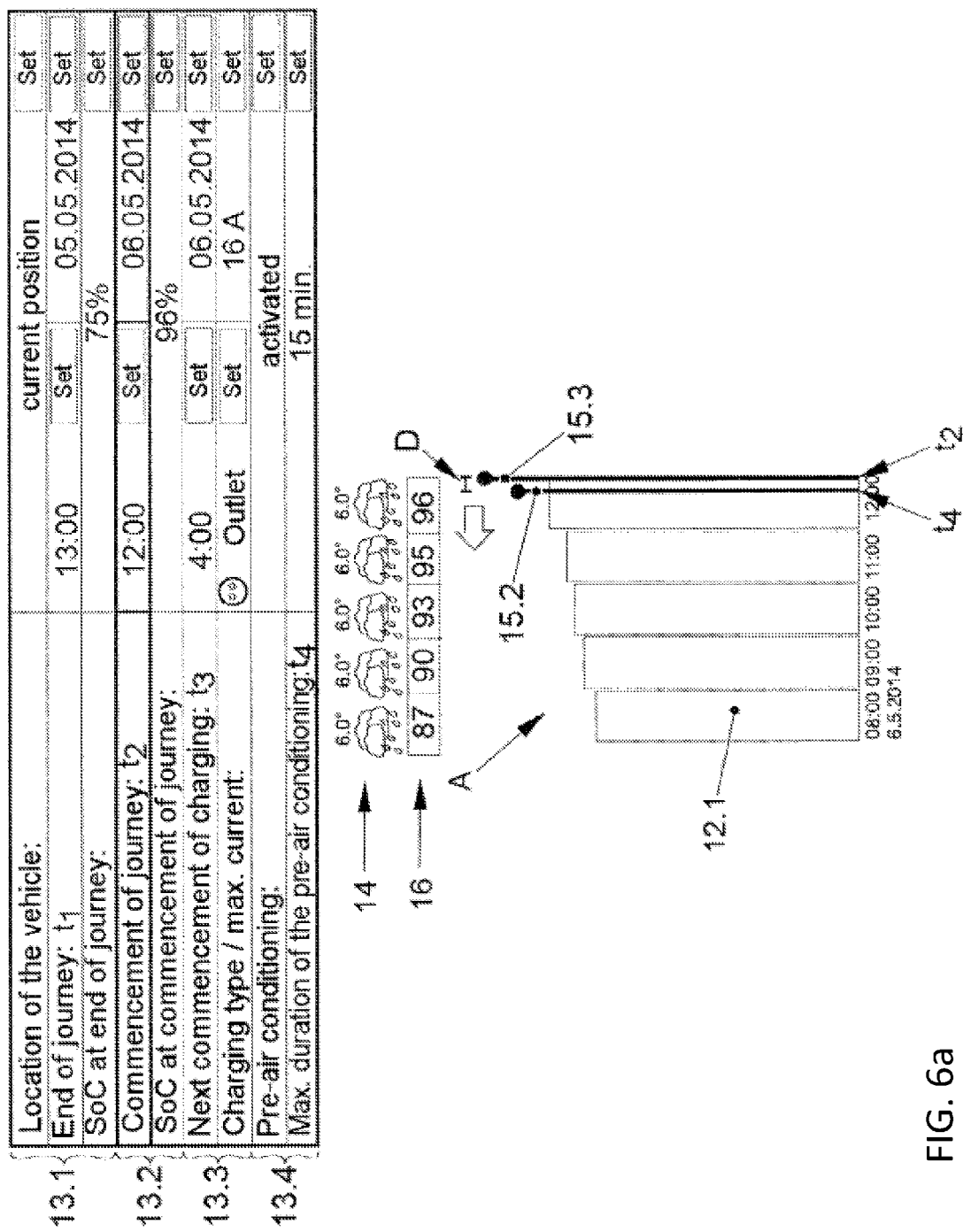
FIGS. 6a to 6c show exemplary embodiments for setting various times for the disclosed method.
Figure 6B:
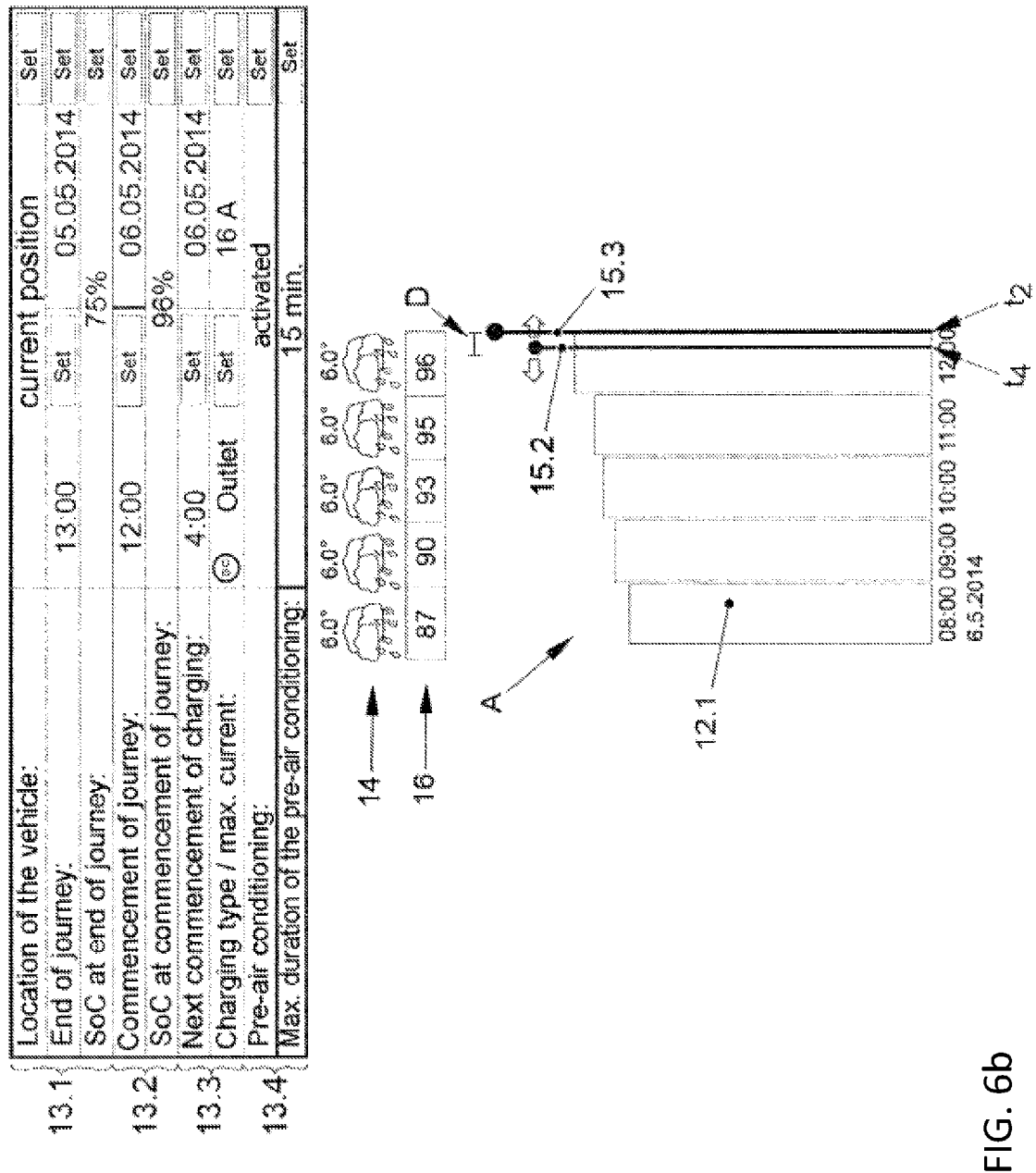
Figure 6C:
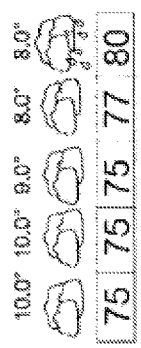
Figure 6C:
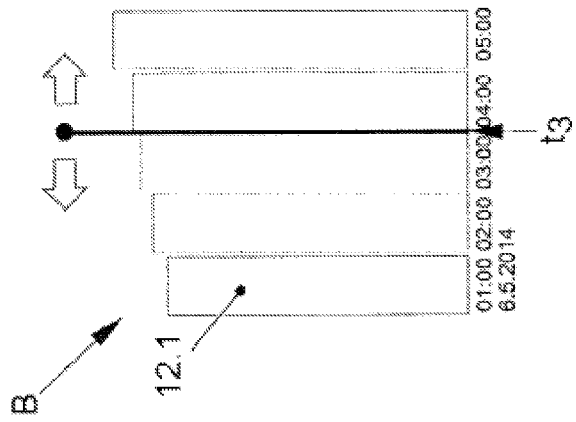

The sections A and B in the bar graph 12 in FIG. 5 are described in greater detail in FIGS. 6a to 6c to explain how the various times t2 to t4 can be set.

If the user wants to set the time t2, for example, he can do this directly in the table view 13 via the corresponding column, which corresponds to the upper column of the columns 13.2. For this purpose, he touches the display panel 2 of the column on the "Set" button. A window then opens, in which the user can set the desired time of day. As an alternative, the user can also move the graphic element 15.3, which is assigned to the time t2, to the desired time of day directly via touch in the bar graph 12. This is shown in FIG. 6a. Since the time for a pre-air conditioning is then located after the time of the commencement of the journey, however, the graphic element 15.2 can be coupled to the movement of the graphic element 15.3. The graphic element 15.2 is then moved to the same extent as the graphic element 15.3. The distance D between the graphic elements 15.2 and 15.3 is retained.

The distance D can be changed by moving the graphic element 15.2. As an alternative, the duration for the pre-air conditioning can also be set via the lower column of the columns 13.4. This is shown in FIG. 6b.

The setting of the target time t3 is shown in FIG. 6c by way of example. As in the previous case of setting the times t2 and t4, either the graphic element 15.1 can be actively moved in the bar graph 12 by the user or, as an alternative, the time t3 can be set via the corresponding column in the table view 13.

If one of the times t2 to t4 is set via the corresponding graphic element 15.1 to 15.3, the display in the table view 13 is automatically updated accordingly. If one of the times t2 to t4 is set via the display in the table view 13, the position of the corresponding graphic element 15.1 to 15.3 is adapted to the entry accordingly.

If one of the times t2 to t4 is updated by the user, in particular the target time t3 and/or the time t4, at which a pre-air conditioning is intended to start, the temporal development is predicted anew.

However, if only the time t2 is changed and if the vehicle 7 is not charged during the resting phase and pre-air conditioning is not desired, a new prediction does not need to be started.

The temporal development of the weather can also be constantly checked. If there are changes in the weather forecast within the determined period t, the forecast of the temporal development of the range R must also be updated.

The range forecast can be automatically generated. In the case of an automatic generation, default settings for the forecast are used. For example, the user can store preferred settings for the times t2 to t4 in the vehicle 7. As an alternative, all settings can also be determined via a driving history.

The range forecast can also be manually set by the user, however. In this case, as explained above, the user sets all times t2 to t4, a target state of charge of the vehicle battery 5, and a pre-air conditioning himself.

In addition, the range prediction can also take place semi-automatically. In this case, many settings are taken from the table view 13 and many are manually set by the user. For example, a target state of charge can always be specified. In this case, the state of charge for the traction battery 5 deemed by the manufacturer to be optimal is stored in the table view 13.

In the case of a hybrid vehicle, as an alternative, a depiction of the total range, i.e., the sum of the predicted electric range and the conventional range, can also be depicted, wherein a prediction for the conventional range is not generated. As a result, the user is then displayed not only a portion of the achievable range, but also the total achievable range of the vehicle 7. In particular, the electric range is depicted so as to be visually separated from the conventional range, so that the user can nevertheless read the purely electric range from the combined display.

A consumption display system for a vehicle is known from DE 10 2010 038 539 A1. This system comprises a display for depicting consumption information and means for ascertaining the present energy consumption of the vehicle. A central processing unit generates consumption information as a function of the ascertained energy consumption and displays this information in the display. Furthermore, a navigation system is connected to the central processing unit. The central processing unit stores a starting point and destination point pair ascertained by the navigation system as well as the particular distance covered and at least one consumption value ascertained between the starting point and the destination point. This consumption value is displayed in the display on demand.

A vehicle is known from DE 10 2010 001 011 A1, in the case of which the electric power uptake of at least one auxiliary assembly of the motor vehicle can be reduced or completely shut off during purely electric driving depending on a driver's actuation of a control element, to increase the electric range of the motor vehicle during purely electric driving. The vehicle can further comprise a monitoring device for the state of charge of an electric energy accumulator. This monitoring device can reduce or completely shut off the power uptake of an auxiliary assembly on the basis of the electric power uptake. The increase in range achieved as a result is displayed to the driver.

DE 10 2011 113 714 A1 makes known a method in which, on the basis of information related to the vehicle and the driving distance, an energy reserve available for propelling the vehicle is ascertained, a range based on the available energy reserve is determined via an allocation instruction, and a climate state is detected, wherein this is taken into account in the determination of the range.

A method for determining the range of a motor vehicle is known from WO 2012/048766. In this case, climatic ambient conditions and the temperature or the physical/chemical state of at least one predetermined component of the motor vehicle is taken into account when determining the range of a motor vehicle. In this case, a range determination can be carried out even before the commencement of driving.

LIST OF REFERENCE NUMBERS 1 device
2 display panel
3 prediction unit
4 determination unit
5 energy accumulator; traction battery
6 network
7 vehicle
8 detection unit
9 control device
10 cellular phone
11 determination unit
12 bar graph
13 table view
13.1-13.4 columns of the table view
14 icons for weather forecast
15.1-15.3 graphic elements
16 state of charge of the battery; SoC
x first axis
y second axis
A; B sections of the bar graph
R range
$t_1$ time of the end of the journey
$t_2$ time of the commencement of the journey
$t_3$ target time
$t_4$ time at which the pre-air conditioning is started

The invention claimed is:

1. A method for forecasting predicted remaining driving ranges of a transportation vehicle for a plurality of times within a predetermined period of time in the future, wherein the transportation vehicle is at least partially electric driven, the method comprising:

detecting, by the transportation vehicle, when a first operating mode of the transportation vehicle is ended, wherein, during the first operating mode, an engine of the transportation vehicle is on, wherein the transportation vehicle switches into a second operating mode in response to the first operating mode ending, wherein, during the second operating mode, the engine of the transportation vehicle is off;

determining, by the transportation vehicle, a state of charge and corresponding predicted remaining driving range of the transportation vehicle at the time the first operating mode ends, in response to detection of the first operating mode ending;

determining, by the transportation vehicle, forecasted weather conditions for transportation vehicle surroundings over the predetermined period of time in the future, wherein the predetermined period of time begins at the first operating mode end time, wherein the transportation vehicle is in the second operating mode for at least a portion of the predetermined period of time;

determining, by the transportation vehicle, a plurality of adjusted, predicted, remaining driving ranges corresponding to the state of charge determined when the first operating mode ends based on the forecasted weather conditions and the state of charge and predicted driving range determined when the first operating mode ends, wherein the plurality of adjusted, predicted, remaining driving ranges correspond to the plurality of times during the predetermined period of time and take into consideration forecasted weather conditions at the plurality of times during the predetermined period of time; and transmitting, by the transportation vehicle, the plurality of adjusted, predicted, remaining driving ranges for the plurality of times during the predetermined period of time along with the forecasted weather conditions to the mobile phone for display.

2. The method of claim 1, wherein the first operating mode is a transportation vehicle driving mode.

3. The method of claim 1, further comprising determining, by the transportation vehicle, a predicted time, at which the transportation vehicle will switch from the second operating mode to the first operating mode, and the further time is transmitted to the mobile phone for display.

4. The method of claim 1, further comprising determining, by the transportation vehicle, a position of the transportation vehicle in the second operating mode.

5. The method of claim 1, further comprising, determining, by the transportation vehicle, whether an energy accumulator of the transportation vehicle is charged during the second operating mode, and
in response to determination that the energy accumulator being charged, predicting, by the transportation vehicle, the state of charge of the energy accumulator based on the predicted state of charge as part of the determination of the plurality of adjusted predicted, remaining driving ranges of the transportation vehicle.

6. The method of claim 5, further comprising:
determining, by the transportation vehicle, a target energy quantity, which the energy accumulator of the transportation vehicle should have at a certain time;
determining, by the transportation vehicle, a target time, at which charging the energy accumulator must be started to provide the target energy quantity at the certain time, and
outputting, by the mobile phone, indication of the target time.

7. The method of claim 1, wherein a resolution of time increments displayed within the predetermined time period is based upon a resolution of time increments for the weather forecast.

8. The method of claim 1, further comprising generating, by the mobile phone, a graphic depiction on a display panel to output the adjusted, predicted, remaining driving range data transmitted from the transportation vehicle.

9. The method of claim 8, wherein the graphic depiction comprises a diagram, wherein the predetermined time period is plotted on a first axis and the adjusted predicted, remaining driving range is plotted on a second axis.

10. The method of claim 9, wherein a resolution of the weather forecast is displayed in hour units, and the predetermined time period is 24 hours.

11. The method of claim 8, wherein the graphic diagram has a graphic element for each output time.

12. The method of claim 11, wherein at least one of the graphic elements in the diagram is movable along the first axis, so that the time can be set by moving the graphic element.

13. A device to forecast a predicted driving range of a transportation vehicle for a plurality of times within a predetermined period of time in the future, wherein the transportation vehicle is at least partially electric driven, the device comprising:
a detection unit to detect when a first operating mode of the transportation vehicle ends, wherein, during the first operating mode, an engine of the transportation vehicle is on, wherein the transportation vehicle switches into a second operating mode in response to the detected end of the first operating mode, wherein, during the second operating mode, the engine of the transportation vehicle is off;
a determination unit to determine a state of charge and corresponding predicted remaining driving range of the vehicle at the time the first operating mode ends, in response to the detected end of the first operating mode and, in response to the detected end of the first operating mode, determine forecasted weather conditions for surroundings of the transportation vehicle over the predetermined period of time in the future;
a prediction unit to determine a plurality of adjusted, predicted, remaining driving ranges corresponding to the state of charge and predicted, remaining driving range determined when the first operating mode ends based on the forecasted weather conditions for the plurality of times during the predetermined period of time and the state of charge and predicted, remaining driving range determined when the first operating mode ends, wherein the plurality of adjusted, predicted, remaining driving ranges correspond to the plurality of times during the predetermined period of time and take into consideration forecasted weather conditions at the plurality of times during the predetermined period of time; and
an output unit to output the plurality of adjusted, predicted remaining, driving ranges for the plurality of times during the predetermined period of time along with the forecasted weather conditions.

14. A transportation vehicle that is at least partially electric driven that has a device according to claim 13.

* * * * *